United States Patent [19]

Arai et al.

[11] Patent Number: 5,196,477
[45] Date of Patent: Mar. 23, 1993

[54] SILCONE COMPOSITIONS COMPRISING ORGANIC COMPOUNDS HAVING THE CAPABILITIES OF COORDINATION WITH METALS

[75] Inventors: Masatoshi Arai; Yoshifumi Inoue; Kei Miyoshi, all of Annaka, Japan

[73] Assignee: Shin-Etsu Chemical Co., Ltd., Tokyo, Japan

[21] Appl. No.: 556,496

[22] Filed: Jul. 24, 1990

[30] Foreign Application Priority Data

Jul. 25, 1989 [JP] Japan .................................. 1-192371
Sep. 5, 1989 [JP] Japan .................................. 1-229795

[51] Int. Cl.$^5$ ............................................. C08L 83/04
[52] U.S. Cl. ................................. 524/863; 524/378;
524/357; 524/129; 524/128; 524/127; 524/173;
524/98; 524/285; 524/588; 524/861; 524/755;
524/709; 524/772; 524/710; 524/744; 524/718;
524/773

[58] Field of Search ............... 524/378, 357, 129, 128, 524/127, 173, 98, 285, 588, 861, 863, 755, 772, 709, 710, 744, 718, 773

[56] References Cited

U.S. PATENT DOCUMENTS

| | | | |
|---|---|---|---|
| 3,607,832 | 9/1971 | Hansen | 528/31 |
| 4,033,934 | 7/1977 | Berger | 528/24 |
| 4,465,818 | 8/1984 | Shirahata et al. | 528/15 |
| 4,954,565 | 9/1990 | Liles | 524/588 |
| 4,973,623 | 11/1990 | Haugsby et al. | 524/588 |
| 5,021,089 | 6/1991 | Kuwata et al. | 524/755 |
| 5,026,766 | 6/1991 | Sasaki | 524/588 |
| 5,032,626 | 7/1991 | Evans | 524/588 |
| 5,051,465 | 9/1991 | Yoshida et al. | 524/588 |
| 5,063,270 | 11/1991 | Yukimoto et al. | 524/755 |

Primary Examiner—Melvyn I. Marquis
Assistant Examiner—Karen A. Dean
Attorney, Agent, or Firm—Lowe, Price, Leblanc & Becker

[57] ABSTRACT

Silicone compositions comprising an organopolysiloxane composition and an organic compound capable of coordination with metals are described. Since the organic compound is preferentially adsorbed on a metal surface, the composition is particularly suitable for use in electric or electronic parts to prevent contact failure. A more specific embodiment comprises a diorganopolysiloxane of the average unit formula, $R_aSiO_{(4-a)/2}$, wherein each R independently represents an unsubstituted or substituted monovalent hydrocarbon group, and a is a value of from 1.90 to 2.05, a filler, an alkoxysilane or its hydrolyzate, a silylation catalyst made of an organic silicon compound having at least one specific type of group, an organic tin compound, another organosilicon compound capable of reaction with an alcohol in order to stabilize the composition, and an organic compound capable of coordination with metals.

12 Claims, 1 Drawing Sheet

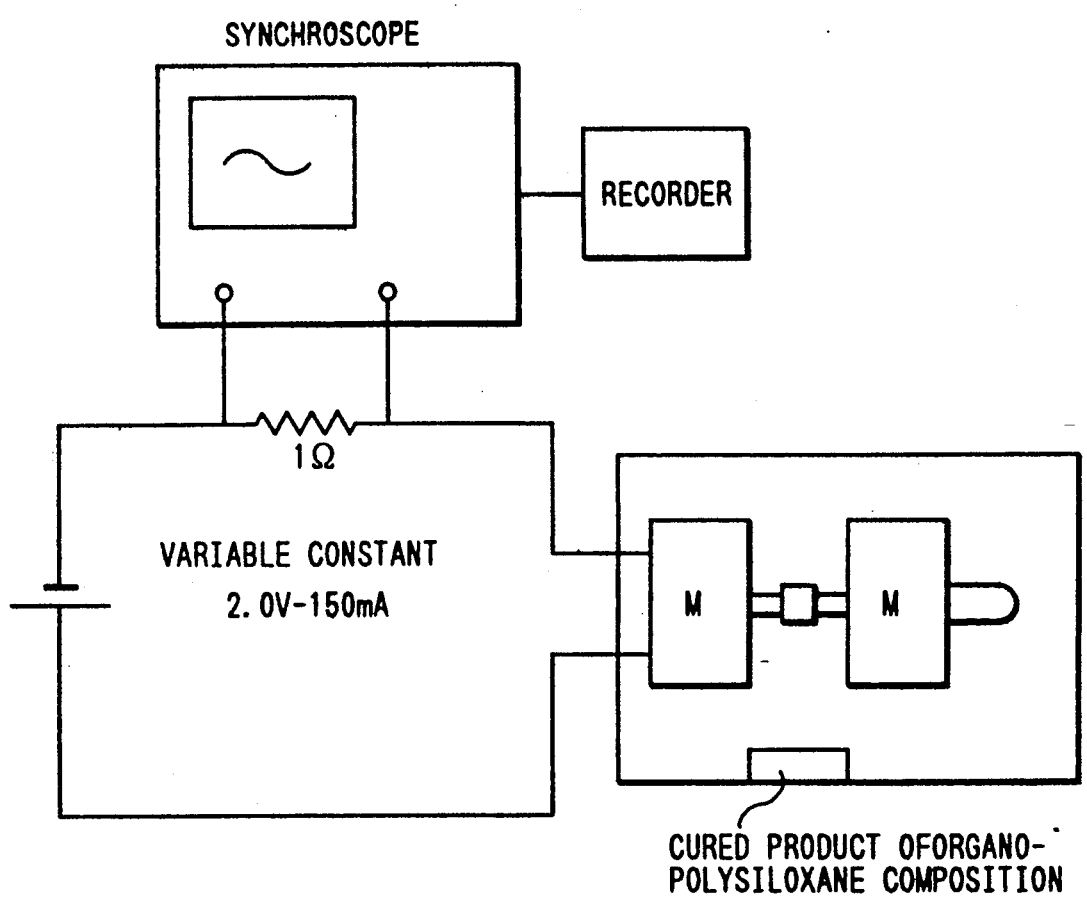

SILCONE COMPOSITIONS COMPRISING ORGANIC COMPOUNDS HAVING THE CAPABILITIES OF COORDINATION WITH METALS

BACKGROUND OF THE INVENTION

1. Field of The Invention

This invention relates to organopolysiloxane compositions which are adapted for use as insulating materials for electric and electronic parts in order to prevent contact troubles of the parts.

2. Description of The Prior Art

Various types of rubber materials and greases have been heretofore employed as insulating materials around contact members of electric and electronic parts or equipments. From the standpoint of the heat resistance and electric characteristics, silicone materials have been frequently used for this purpose. Organopolysiloxanes, which are main components of the silicone compositions, usually contain volatile, low molecular weight siloxanes. These low molecular weight siloxanes gradually release or evaporate from the composition and deposit on the contact members after application of the composition to electric or electronic circuit parts and curing. In this condition, when sparking takes place at electric contacts of the parts, the siloxane is decomposed into silicon dioxide. This will cause the contacts to be insulated, i.e. a so-called contact trouble is disadvantageously produced, so that motor circuits, relay circuits and the like parts do not work normally.

SUMMARY OF THE INVENTION

It is accordingly an object of the present invention to provide a silicone composition which is used as an insulating material at the periphery of contact members for electric or electronic parts or equipment and is substantially free of any contact trouble as will be involved in prior art silicone compositions employed for this purpose.

It is another object of the invention to provide a silicone composition which comprises a minor amount of organic compounds capable of forming a sustaining protective film on exposed portions of electric contacts in a major proportion of organopolysiloxanes with or without other compounds and additives whereby the contact troubles in electric or electronic circuits or the like can be appropriately avoided.

Broadly, the present invention provides a silicone composition which comprises 100 parts by weight of an organopolysiloxane composition and from 0.01 to 15 parts by weight of an organic compound which has the capability of coordination with metals and has a boiling point of from 50 to 300° C. whereby when the silicone composition is applied as an insulating material for electric or electronic parts, the organic compound in the silicone composition is preferentially adsorbed and deposited on metal contacts in an electric or electronic part. The adsorbed organic compound provides a kind of protective film on the metal contacts.

The organopolysiloxane composition used as the main ingredient in the silicone composition of the invention may cover various types of organopolysiloxane compositions including organopolysiloxane compositions vulcanizable with organic peroxides, condensation-type curable compositions, addition reaction-type curable compositions using platinum catalysts, radiation curable compositions, grease compositions and the like.

In a more specific and preferable embodiment of the invention, there is provided a silicone composition using the curable organopolysiloxane composition of the condensation type. More particularly, there is provided a room temperature vulcanizable silicone composition which comprises:

(a) 100 parts by weight of a diorganopolysiloxane having a hydroxyl group, or two or more alkoxy groups, or a vinyloxy group blocked at ends of the molecular chain;

(b) from 1 to 400 parts by weight of a filler;

(c) up to 50 parts by weight of an alkoxysilane of the following general formula or its partial hydrolyzate $$(R^1)_m Si(OR^2)_{4-m}$$

wherein $R^1$ represents a substituted or unsubstituted monovalent hydrocarbon group, $R^2$ represents a lower alkyl group or a lower alkoxyalkyl group, and m is an integer of from 0 to 2;

(d) from 0.01 to 10 parts by weight of an organosilicon compound having at least one group of the following general formula in one molecule $$[(R^3)_2 N]_2 C = N-$$

wherein $R^3$ represents a hydrogen atom or a monovalent hydrocarbon group;

(e) from 0.01 to 10 parts by weight of an organic tin compound;

(f) from 0.1 to 20 parts by weight of an organosilicon compound having a group of the general formula $$\equiv \underset{\underset{R_6}{|}}{\overset{\overset{R_5}{|}}{Si}} C(CH_2)_n COOR^4$$

wherein $R^4$ represents a substituted or unsubstituted monovalent hydrocarbon group, $R^5$ and $R^6$ independently represent a hydrogen atom, a methyl group or an ethyl group, and n is a value of 0, 1 or 2; and (g) from 0.01 to 15 parts by weight of an organic compound which has the capability of coordination with metals and has a boiling point of from 50° to 300° C. whereby when the silicone composition is applied as an insulating material for electric or electronic parts, the organic compound in the silicone composition is preferentially adsorbed and deposited on metal contacts in an electric or electronic part.

The reason why the contact trouble can be prevented by addition of a small amount of an organic compound having the capability of coordination with metals is considered as follows.

As set forth before, low molecular weight siloxanes contained in the organopolysiloxane are gradually vaporized and deposited on electric contact portions in circuits, motors, relays or the like. When sparks take place at the contact portions during operations, the siloxanes are converted into silica, thereby forming an insulating film on the portions. This results in a failure of electric contacts, thereby causing motors or relays not to work normally. If organic compounds having the capability of coordination with metals and are more volatile than the low molecular weight siloxanes are present, the organic compound is preferentially adsorbed and deposited on a fresh metal surface at the contact portion and is allowed to prevent direct adsorption and deposition, on the metal surface, of the silicon dioxide formed by the sparks. It will be noted that the term "coordination with metal" used herein is intended to mean the likelihood of adsorption and deposition of the organic compound used in the present invention. Since the organic compound has a boiling point of from 50° to 300° C., it is more volatile than low molecular weight siloxanes contained in the silicone composition. This is why the organic compound is preferentially absorbed or deposited on the fresh metal surface.

BRIEF DESCRIPTION OF THE DRAWING

The sole FIGURE is a schematic view of a test apparatus for silicone compositions wherein micromotors are driven with use of a variable constant-voltage regulated power supply in an environment having a cured product of the composition.

DETAILED DESCRIPTION AND EMBODIMENTS OF THE INVENTION

In the first embodiment of the invention, the silicone composition comprises an organopolysiloxane composition and an organic compound capable of coordination with metals.

The organopolysiloxane composition is not critical and may be appropriately selected from organopolysiloxane compositions vulcanizable with organic peroxides, condensation-type curable compositions, addition reaction-type curable compositions using platinum catalysts, radiation curable compositions and grease compositions. These compositions are described.

The condensation-type organopolysiloxane composition is comprised mainly of a diorganopolysiloxane of the average unit formula, $R_aSiO_{(4-a)/2}$, wherein each R independently represents an unsubstituted or substituted monovalent hydrocarbon group, and a is a value of from 1.90 to 2.05.

The unsubstituted or substituted monovalent hydrocarbon groups represented by the formula are those having from 1 to 10 carbon atoms and include, for example, alkyl groups such as a methyl group, an ethyl group, a propyl group, a butyl group, a 2-ethylbutyl group, an octyl group and the like, cycloalkyl groups such as a cyclohexyl group, a cyclopentyl group and the like, an alkenyl group such as a vinyl group, a hexenyl group and the like, aryl groups such as a phenyl group, a tolyl group, a xylyl group, a naphthyl group, a diphenyl group and the like, aralkyl groups such as a benzyl group, a phenylethyl group and the like, and those groups indicated above wherein part or all of the hydrogen atoms bonded to the carbon atoms of the groups are substituted with halogen atoms, a cyano group and the like, e.g. a chloromethyl group, a trifluoropropyl group, a 2-cyanoethyl group, a 3-cyanopropyl group and the like.

With the condensation-type organopolysiloxanes, the molecular chain should be blocked with a hydroxyl group or two or three alkoxy or vinyloxy groups at terminal ends thereof. In order to obtain good physical properties and mechanical strength, the organopolysiloxanes should preferably have a viscosity of not less than 25 cs. at 25° C.

The composition should further comprise a crosslinking agent in amounts of from 0.1 to 50 wt% of the composition. Examples of the agent include silanes or siloxanes having two or more hydrolyzable groups in one molecule. Such hydrolyzable groups include, for example, an alkoxy group, an alkenyloxy group, a carboxyl group, an amino group, an aminoxy group, an oxime group, an amido group and the like.

In general, curing catalysts are used in the condensation-type, curable organopolysiloxane composition. Examples of the curing catalyst include: metal salts of organic carboxylic acids such as dibutyltin diacetate, dibutyltin dilaurate, butyltin-tri-2-ethylhexoate, iron-2-ethylhexoate, cobalt-2-ethylhexoate, manganese-2-ethylhexoate, zinc-2-ethylhexoate, stannous caprylate, tin naphthenate, tin oleate, tin butyrate, titanium naphthenate, zinc naphthenate, cobalt naphthenate, zinc stearate and the like; organic titanic acid esters such as tetrabutyl titanate, tetra-2-ethylhexyl titanate, triethanolamine titanate, tetra(isopropenyloxy)titanate and the like, organotitanium compounds such as organosiloxy titanium, β-carbonyl titanium and the like; alkoxydialuminium compounds; aminoalkyl-substituted alkoxysilanes such as 3-aminopropyltriethoxysilane, N-(trimethoxysilylpropyl)ethylenediamine and the like; amine compounds and salts thereof such as hexylamine, dodecylamine phosphate and the like; salts of alkali metals and lower fatty acids such as potassium acetate, sodium acetate, lithium oxalate and the like; dialkylhydroxylamines such as dimethylhydroxylamine, diethylhydroxylamine and the like; guanidine compounds such as methylguanidine and compounds of the following formulae

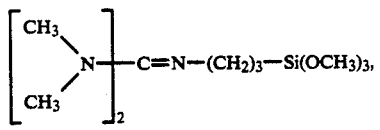

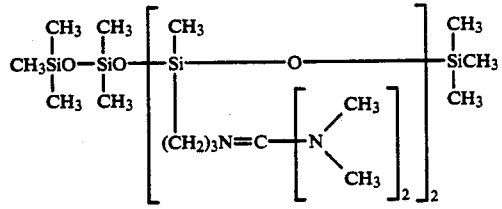

and guanidyl group-containing silane and siloxane compounds. These curing agents may be used singly or in combination and are used in an amount of from 0.01 to 10 wt % of the composition.

The organopolysiloxane compositions curable by addition reaction in the presence of platinum are comprised mainly of a diorganopolysiloxane which has a vinyl group at terminal ends of the molecular chain and/or in the molecular chain. The crosslinking agent used is a linear, cyclic or branched organohydrogenpolysiloxane having at least two ≡Si—H groups in one molecule.

Although metals of GROUP VIII of the Periodic Table may be used as the catalyst for the addition reaction, it is preferred to use platinum compounds or complexes of platinum and olefins. These catalysts are used in amounts of from 0.1 to 200 ppm, calculated as Pt, of the composition.

In the organopolysiloxane compositions of the organic peroxide vulcanization type, there are used as a main ingredient diorganopolysiloxanes which have a vinyl group at terminal ends of the molecular chain and/or in the molecular chain. Examples of the organic peroxides used as a crosslinking agent include benzoyl peroxide, dicumyl peroxide, di-t-butyl peroxide and the like. The agent is usually used in amounts of from 0.01 to 5 wt % of the composition.

The diorganopolysiloxanes used as a main ingredient in the radiation-curable organopolysiloxane composition are those which have, at terminal ends of the molecular chain and/or in the molecular chain, an unsaturated group such as a vinyl group, an allyl group, an alkenyloxy group, an acryl group, a mercapto group, an epoxy group, a hydrosilyl group or the like. The reaction initiators used in this type of composition are those well known in the art, including, for example, acetophenone, propiophenone, benzophenone, xanthol, fluorene, benzaldehyde, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4'-dimethoxybenzophenone, 4-chloro-4'-benzoylbenzophenone, 3-chloroxanthone, 3,9-dichloroxanthone, 3-chloro-8-nonylxanthone, benzoin, benzoin methyl ether, benzoin butyl ether, bis(4-dimethylaminophenyl)ketone, benzyl methoxyketal, 2-chlorothioxanthone and the like. These initiators are used in amounts of from 1 to 50 wt % of the composition.

The diorganopolysiloxanes used as a main ingredient in the grease compositions are preferably those having a trimethylsilyl group at terminal ends of the molecular chain. The composition further comprises a thickening agent such as metallic soaps such as lithium stearate, aerosil or the like. The agent is usually used in amounts of from 1 to 50 wt % of the composition.

The organic compounds used in combination with the organopolysiloxanes are not critical, provided that they are capable of coordination with metals and have a boiling point of from 50° to 300° C. at normal pressures. Preferably, the compounds should not only have the capability of coordination with metals by adsorption, but also have anti-corrosive action on the metals. In a physical aspect, the organic compound is more likely to adsorb and deposit on a metal surface, thereby forming a kind of a protective layer or film on the metal surface. Specific examples of the organic compounds include ethers such as anisole, diglyme and the like, β-ketoesters such as ethyl acetoacetate, methyl acetoacetate and the like, diketones such as acetylacetone, phosphines such as triethylphosphine, triphenylphosphine and the like, phosphites such as trimethyl phosphite, tributyl phosphite and the like, phosphates such as trimethyl phosphate, triethyl phosphate, triphenyl phosphate and the like, organic phosphorus compounds such as trimethyl phosphite, triethyl phosphite and the like, olefins such as styrene, 1-octene, cyclohexene and the like, acetylene compounds of the following formulae

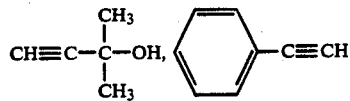

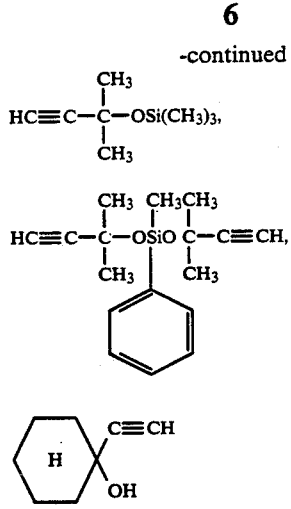

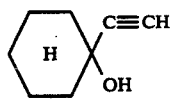

sulfides such as diphenyl sulfide, phenylbenzyl sulfide and the like, sulfoxides such as dimethylsulfoxide, lactones, lactams, and the like.

The amount of the organic compound is in the range of from 0.01 to 15 parts by weight, preferably from 0.1 to 5 parts by weight, per 100 parts by weight of the organopolysiloxane composition. If the amount is less than 0.01 part by weight, little effect of the compound is shown. Over 15 parts by weight, the physical properties of the silicone composition become poor.

The silicone composition of the invention may further comprise various fillers, if necessary. Examples of the fillers include finely divided silica such as fumed silica, precipitated silica or the like, diatomaceous earth, metal oxides such as iron oxides, zinc oxides, titanium oxides and the like with or without the surface being treated with silanes, metal carbonates such as calcium carbonate, magnesium carbonate, zinc carbonate and the like, asbestos, glass wool, carbon black, finely divided mica, fused silica powder, and synthetic resin powders such as polystyrene, polyvinyl chloride, polypropylene and the like. These fillers should preferably be dried prior to use in order to remove the moisture therefrom. The amount of the filler is not critical on the condition that the purposes of the invention are attained.

A more specific and preferable embodiment of the invention is described. In this embodiment, the diorganopolysiloxane which has been illustrated as a condensation-type diorganopolysiloxane in the first embodiment is used as a main ingredient. The silicone composition according to this embodiment comprises (a) the condensation-type diorganopolysiloxane, (b) a filler, (c) an alkoxysilane or its partial hydrolyzate, (d) an organosilicon compound having a specific type of group in the molecule, (e) an organotin compound, (f) an organosilicon compound having a specific type of group, and (g) an organic compound capable of coordination with metals.

The respective ingredients are described.

The ingredient (a) is a diorganopolysiloxane of the average unit formula, $R_aSiO_{(4-a)/2}$, wherein each R and a have, respectively, the same meanings as defined with respect to the first embodiment. Specific examples of the unsubstituted or substituted monovalent hydrocarbon represented by R are not indicated here since those hydrocarbon groups set out before are likewise usable in this embodiment. In order to impart good rubber elasticity and mechanical strength to a cured product from the composition of the embodiment, the viscosity of the ingredient (a) should preferably be not less than 25 cs at 25° C.

The ingredient (b) is a filler. The fillers have specifically been described in the first embodiment and such specific fillers are likewise used in this embodiment. The amount of the ingredient (b) is in the range of from 1 to 400 parts by weight per 100 parts by weight of the ingredient (a). If the amount is less than 1 part by weight, the cured product obtained from the composition is unsatisfactory with respect to mechanical strength. Over 400 parts by weight, the viscosity of the composition increases, causing not only the working properties to be worsened, but also the rubber strength after curing to be lowered. Thus, an intended rubber elastomer is difficult to obtain.

The ingredient (c) used in the present invention is an alkoxysilane $$(R^1)_m Si(OR^2)_{4-m} \qquad (I)$$

In the formula, $R^1$ represents a substituted or unsubstituted monovalent hydrocarbon group having from 1 to 10 carbon atoms, $R^2$ represents a lower alkyl group having from 1 to 8 carbon atoms or a lower alkoxyalkyl group having from 2 to 5 carbon atoms, and m is an integer of from 0 to 2. Examples of the monovalent hydrocarbon group represented by $R^1$ are those defined with respect to R of the average unit formula and typically include a methyl group, an ethyl group, a propyl group, a vinyl group, a phenyl group, trifluoropropyl group and the like. The lower alkyl groups and the lower alkoxyalkyl groups represented by $R^2$ include a methyl group, an ethyl group, a propyl group, a butyl group, a methoxyethyl group, an ethoxyethyl group and the like.

Specific examples of the alkoxysilane include methyltrimethoxysilane, vinyltrimethoxysilane, tetramethoxysilane, tetracthoxysilane, methyltriethoxysilane, ethyltrimethoxysilane, methyltriisopropoxysilane, phenyltrimethoxysilane, methyltri(methoxyethoxy)silane, phenyltri(methoxyethoxy)silane, m vinyl tri(methoxyethoxy)silane, tetra(ethoxyethoxy)silane, trifluoropropyltrimethoxysilane and the like. Besides, there are also used partial hydrolyzates of these alkoxysilanes, i.e. siloxanes obtained by partial hydrolysis and condensation of the alkoxysilanes.

Of these compounds, it is preferred to use methyltrimethoxysilane, vinyltrimethoxysilane, phenyltrimethoxysilane, tetramethoxysilane, methyltri(methoxyethoxy)silane, vinyltri(methoxyethoxy)silane and the like.

The ingredient (c) is used in an amount of up to 50 parts by weight, preferably up to 10 parts by weight, per 100 parts by weight of the ingredient (a). If the amount exceeds 50 parts by weight, the resultant cured product becomes poor in rubber elasticity, with a poor economy.

The ingredient (d) used in the present invention is an organosilicon compound having at least one group of the following general formula in one molecule $$[(R^3)_2N]_2C = N - \qquad (II)$$

wherein $R^3$ represents a hydrogen atom or a monovalent hydrocarbon group as defined by $R^1$. The organosilicon compound acts as a catalyst for silylation of water and a silanol group in a base compound.

The group of the above general formula (II) is bonded to a silicon atom through a linking group. Preferable examples of the linking group include an alkylene group or an oxyalkylene group.

Specific examples of the ingredient (d) include compounds of the following formulae

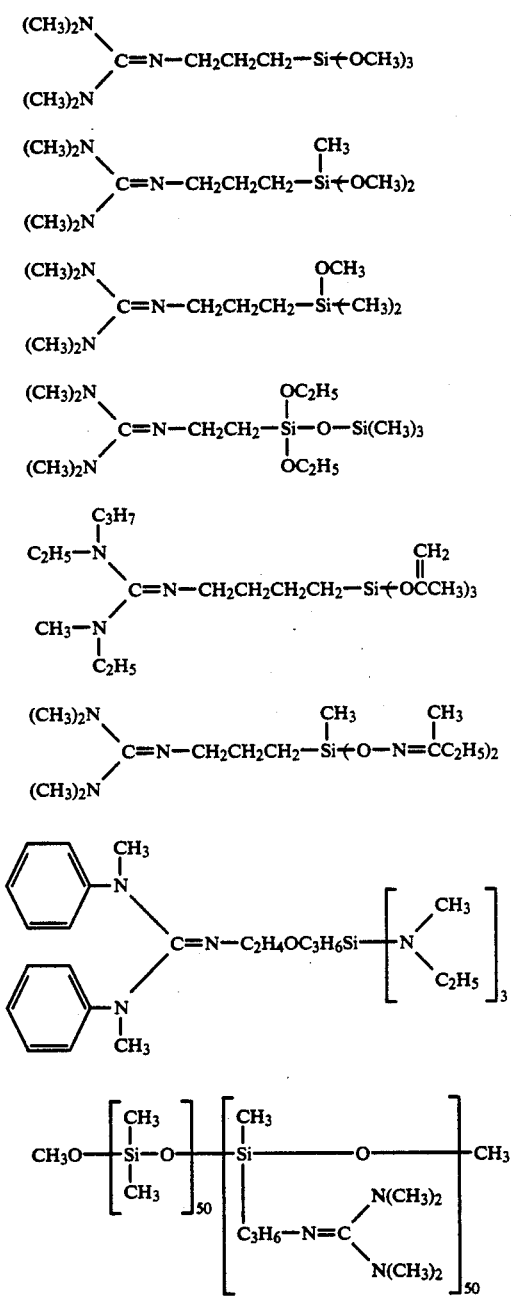

Of these, because of the ease in preparation, the organosilane of the following formula is preferred.

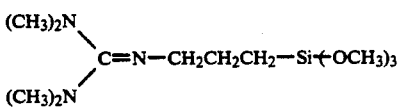

The amount of the ingredient (d) is in the range of from 0.01 to 10 parts by weight, preferably from 0.1 to 5 parts by weight, per 100 parts by weight of the ingredient (a). If the amount is less than 0.01 part by weight, the reaction between a base compound consisting of the ingredients (a) and (b) and the ingredient (c) does not proceed satisfactorily by the action of the ingredient (d), so that it takes an undesirable long time for the reaction. In addition, hydroxyl groups and water which have to be consumed by the reaction will be undesirably left in the resultant reaction product, leading to a low storage stability of the composition. Over 10 parts by weight, the reaction product may undergo discoloration, with a poor economy.

The ingredient (e) used in the present invention is an organic tin compound which may be any condensation reaction catalyst ordinarily used in this type of composition. Examples of the organic tin compound include carboxylates such as tin naphthanate, tin caprylate, tin oleate and the like, dibutyltin diacetate, dibutyltin dioctate, dibutyltin dilaurate, dibutyltin dioleate, diphenyltin diacetate, dibutyltin oxide, dibutyltin dimethoxide, dibutylbis(triethoxysiloxy)tin, dibutyltin dibenzylmaleate and the like. The amount of the ingredient (e) is in the range of from 0.01 to 10 parts by weight, preferably from 0.1 to 2 parts by weight, per 100 parts by weight of the ingredient (a). If the amount is less than 0.01 part by weight, the function as the curing catalyst is not shown satisfactorily, with an attendant disadvantage that the curing time becomes long and the curing in the inside of a rubber layer does not proceed satisfactorily. Over 10 parts by weight, the storage stability of the composition is impeded.

The organosilicon compound used as the ingredient (f) should have a group of the following general formula

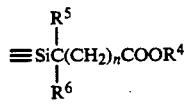

(III)

wherein $R^4$ represents a substituted or unsubstituted monovalent hydrocarbon group as defined by $R^1$, $R^5$ and $R^6$ independently represent a hydrogen atom, a methyl group or an ethyl group, n is a value of 0, 1 or 2, and r is an alkyl group.

This compound is used to remove an alcohol, which has been produced by reaction between the silanol groups and moisture contained in the diorganopolysiloxane of the ingredient (a) and the filler of the ingredient (b) and the alkoxysilane or its partial hydrolyzate of the ingredient (c), by reaction according to the following reaction formula

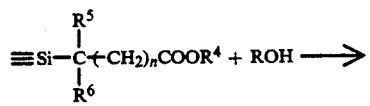

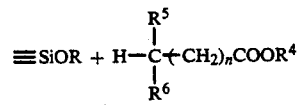

wherein $R^4$, $R^5$, $R^6$, n and R have, respectively, the same meanings as defined above.

The alkoxysilane or alkoxysiloxane and the ester compounds produced by the above reaction do not adversely influence the composition of the invention. Accordingly, the addition of the organic silicon compound of the ingredient (f) imparts good storage stability to the composition of the invention.

Since the reaction between the organic silicon compound of the ingredient (f) and the alcohol proceeds readily and stoichiometrically, the amount of the ingredient (f) should satisfy the requirement that

To this end, the amount of the ingredient (f) is in the range of from 0.1 to 20 parts by weight, preferably not larger than 10 parts by weight, per 100 parts by weight of the ingredient (a). If the amount is less than 0.1 part by weight, the alcohol may be left in the composition. In general, the amount over 10 parts by weight is not necessary, and is not advantageous in view of economy.

If the ingredient (f) is a silicon compound having both the group of the general formula (III) and an alkoxysilyl group of the formula, $\equiv Si(OR^7)$ l, wherein $R^7$ represents an alkyl or alkoxy group as defined by $R^2$, and l represents an integer of 2 or 3, the ingredient (c) used as the curing agent may not be added. This is why the amount of the ingredient is not defined with respect to the lower limit.

Specific examples of the ingredient (f) include those compounds of the following formulae.

$(CH_3)_3SiCH_2COOCH_3$, $(CH_3)_3SiCH_2COOC_2H_5$ $(CH_3)_3SiCH_2COO(n)C_3H_7$, $(CH_3)_3SiCH_2COO(n)C_4H_9$ $(CH_3)_3SiCH_2COO(n)C_8H_{17}$,

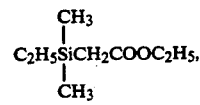

$(C_2H_5)_3SiCH_2COOC_2H_5$,

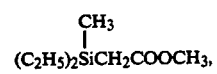

$((n)C_3H_7)_3SiCH_2COOC_2H_5$, $((n)C_3H_7)_3SiCH_2COOCH_3$, $((n)C_3H_7)_3SiCH_2COO(n)C_4H_9$, $((n)C_3H_7)_3SiCH_2COO(n)C_8H_{17}$,

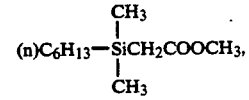

-continued (n)C$_6$H$_{13}$—Si(CH$_3$)$_2$CH$_2$COOC$_2$H$_5$, (n)C$_6$H$_{13}$—Si(CH$_3$)$_2$CH$_2$COO(n)C$_4$H$_9$, (n)C$_6$H$_{13}$—Si(CH$_3$)$_2$CH$_2$COO(n)C$_6$H$_{13}$, (n)C$_8$H$_{17}$—Si(CH$_3$)$_2$CH$_2$COOC$_2$H$_5$, (n)C$_8$H$_{17}$—Si(CH$_3$)$_2$CH$_2$COOCH$_3$, (n)C$_8$H$_{17}$—Si(CH$_3$)$_2$CH$_2$COO(n)C$_4$H$_9$, (n)C$_8$H$_{17}$Si(CH$_3$)$_2$CH$_2$COO—Ph, Ph—Si(CH$_3$)$_2$CH$_2$COOCH$_3$, Ph—Si(CH$_3$)$_2$CH$_2$COOC$_2$H$_5$, Ph—Si(CH$_3$)$_2$CH$_2$COO(n)C$_4$H$_9$, Ph—Si(CH$_3$)$_2$CH$_2$COO(n)C$_6$H$_{13}$, Ph—Si(CH$_3$)$_2$CH$_2$COO(n)C$_8$H$_{17}$,

[Ph]$_2$Si(CH$_3$)CH$_2$COOCH$_3$,

[Ph]$_2$Si(CH$_3$)CH$_2$COOC$_2$H$_5$,

[Ph]$_2$Si(CH$_3$)CH$_2$COO(n)C$_4$H$_9$,

-continued

[Ph]$_2$Si(CH$_3$)CH$_2$COO(n)C$_6$H$_{13}$,

[Ph]$_2$Si(CH$_3$)CH$_2$COO(n)C$_8$H$_{17}$,

[Ph]$_3$SiCH$_2$COOC$_2$H$_5$ (H$_3$C—Ph)Si(CH$_3$)$_2$CH$_2$COOC$_2$H$_5$, (CH$_3$)$_3$SiCH$_2$COO—(CH$_3$-Ph), (CH$_3$)$_3$SiCH$_2$CH$_2$COOC$_2$H$_5$, (C$_2$H$_5$)$_3$SiCH$_2$CH$_2$COOCH$_3$, (CH$_3$)$_3$SiCH(CH$_3$)COOC$_2$H$_5$, (CH$_3$)$_3$SiCH(CH$_3$)COOCH$_3$, (CH$_3$O)$_3$SiCH$_2$COOC$_2$H$_5$, (CH$_3$O)$_2$Si(CH$_3$)CH$_2$COOC$_2$H$_5$, (CH$_3$O)$_3$SiCH$_2$COOCH$_3$, (CH$_3$O)Si(CH$_3$)$_2$CH$_2$COOCH$_3$, (CH$_3$O)$_3$SiCH$_2$COO(n)C$_4$H$_9$, (CH$_3$O)$_3$SiCH$_2$COO(n)C$_8$H$_{17}$, (CH$_3$O)$_2$(Ph)SiCH$_2$COOC$_8$H$_{17}$, (CH$_3$O)$_3$SiCH$_2$COO—Ph, (C$_2$H$_5$O)$_3$SiCH$_2$COOC$_2$H$_5$, (C$_4$H$_9$O)$_3$SiCH$_2$COOC$_2$H$_5$,

[(CH$_3$-Ph)—O]$_3$SiCH$_2$COOC$_2$H$_5$, (C$_2$H$_5$O)$_3$SiCH$_2$COO(n)C$_4$H$_9$, (C$_2$H$_5$O)$_3$SiCH$_2$COO(n)C$_8$H$_{17}$, (CH$_3$O)$_3$SiCH(CH$_3$)COOC$_2$H$_5$, (CH$_3$O)$_3$SiCH$_2$CH$_2$COOCH$_3$,

-continued

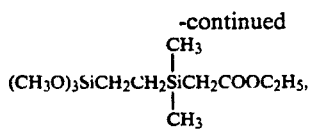

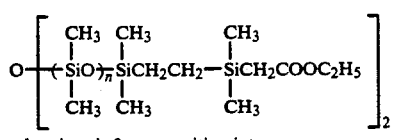

wherein n is 0 or a positive integer.

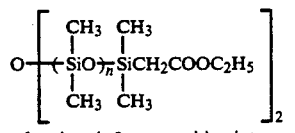

wherein n is 0 or a positive integer.

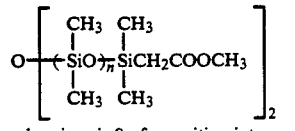

wherein n is 0 of a positive integer

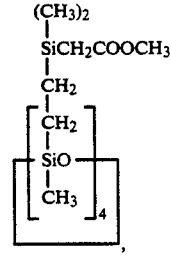

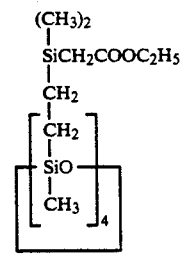

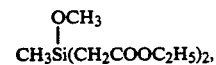

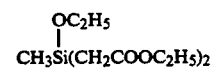

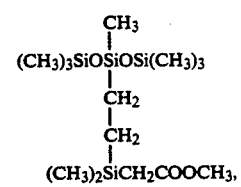

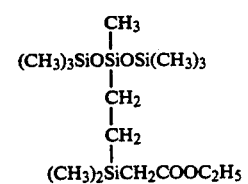

-continued

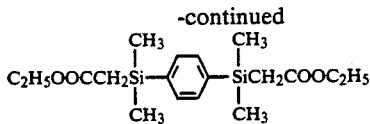

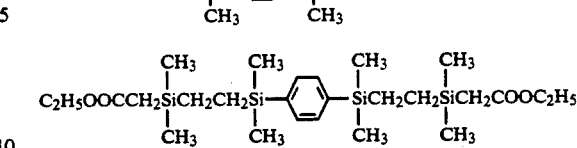

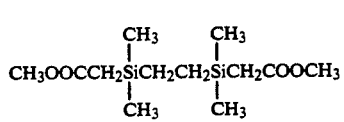

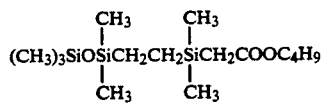

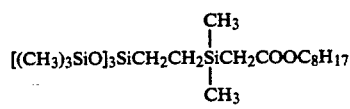

The ingredient (f) may be partial hydrolyzates of the compounds indicated above, i.e. siloxanes obtained by partial hydrolysis and condensation.

The ingredient (g) used in this embodiment is an organic compound capable of coordination with metals which are the same as those described in the first embodiment and are not particularly described herein. The amount of the ingredient (g) is in the range of from 0.01 to 15 parts by weight, preferably from 0.1 to 5 parts by weight, per 100 parts by weight of the ingredient (a).

The composition of this embodiment can be obtained by mixing the ingredients (a) to (g). For the mixing, the ingredients (a) to (g) may be mixed at one time. Alternatively, the ingredients (a) to (e) may be mixed at reduced pressure under hermetically sealed conditions. After which the ingredients (f) and (g) are added to the mixture. The mixing temperature is preferably in the range of from room temperature to 100° C. The resultant composition is curable at room temperature.

The compositions of the first and second embodiments of the invention may further comprise, if necessary, various additives known in the art. Such additives include, for example, thixotropy-imparting agents such as polyethylene glycol and its derivatives, pigments, dyes, antioxidants, antistatic agents, thermal conductivity improvers such a antimony oxide, chlorinated paraffin and the like, adhesion-imparting agents, so-called carbon functional silanes having an amino group, epoxy group or thiole group, metal salts of carboxylic acids, metal alcoholates and the like.

The compositions of the invention do not cause contact troubles of electric or electronic parts or devices and are particularly suitable for use as adhesives, coatings, potting materials and the like for electric or electronic parts.

The present invention is more particularly described by way of examples, which should not be construed as limiting the invention thereto. In the examples, parts and percent are by weight.

EXAMPLE 1

94 parts of dimethylpolysiloxane having a low molecular weight content of 1.0% and a viscosity of 5,000 cs., and blocked with a hydroxyl group at terminal ends of the molecular chain, 5 parts of tetraethoxysilane, 0.1 part of dibutyltin dimaleate and 1.0 part of ethyl acetoacetate were uniformly mixed and cured at room temperature for 24 hours.

The low molecular weight siloxane contained in the dimethylpolysiloxane is a cyclic dimethylpolysiloxane of the following formula

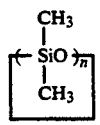

wherein n is an integer of from 3 to 20.

Subsequently, 100 g of the cured product was placed in a container with a capacity of 5 liters, along with micro motors which could be driven with a variable constant-voltage regulated power supply with ratings of 2.0 V-150 mA. This is particularly shown in the attached drawing, in which M indicates a micro motor. The waveform of the motors was observed through a synchroscope and recorded with a recorder. At the time when the waveform was abnormally changed, it was determined that the contact failure took place. The occurrence of the contact failure at 20° C. after 50 hours and 500 hours was determined using three motors, with the results shown in Table 1.

EXAMPLE 2

The general procedure of Example 1 was repeated except that the low molecular weight siloxane content was 0.2%. The evaluation was also made in the same manner as in Example 1. The results are shown in Table 1.

COMPARATIVE EXAMPLE 1

The general procedure of Example 1 was repeated without use of ethyl acetoacetate. The resultant composition was evaluated in the same manner as in Example 1. The results are shown in Table 1 below.

TABLE 1

| | Waveform of Motors After 50 hours at 20° C. | Waveform of Motors After 500 hours at 20° C. |
|---|---|---|
| Example 1 | no anomaly in three motors | anomaly occurring in one motor |
| Example 2 | no anomaly in three motors | no anomaly in three motors |
| Comp. Ex. 1 | anomaly occurring in three motors | (motors stopped) |

EXAMPLES 3 TO 7 AND COMPARATIVE EXAMPLE 2

97 parts of methylphenylpolysiloxane, which had a viscosity of 3,000 cs. and a vinyl group at terminal ends of the molecular chain and which had a content of the phenyl groups of 10 mole % and a content of a low molecular weight siloxane of 0.3% was mixed with 3 part of a ≡Si—H group-containing methylhydrogenpolysiloxane having a viscosity of 20 cs. and an isopropanol solution of chloroplatinic acid in an mount of 50 ppm based on the total polysiloxane. Organic compounds capable of coordination with metals were each added to the above composition, followed by curing at room temperature for 24 hours. For comparison, any coordinating organic compound was added to the composition, which was cured similarly at room temperature for 24 hours. The resultant cured products were evaluated in the same manner as in Example 1 wherein the evaluation conditions were 50° C.×500 hours. The results are shown in Table 2 below.

TABLE 2

| Example No. | Organic Compound | Amount Based Total Amount of Polysiloxanes | Waveform of Three Motors After 500 Hours at 50° C. |
|---|---|---|---|
| 3 | A* | 0.1 | anomaly occurring in one motor |
| 4 | A | 1 | no anomaly in three motors |
| 5 | A | 7 | no anomaly in three motors |
| 6 | (C₂H₅O)₃P=O | 0.5 | no anomaly in three motors |
| 7 | (C₂H₅O)₃P=O | 3 | no anomaly in three motors |
| Comp. Ex. 2 | nil | — | anomaly occurring in three motors (motors stopped) |

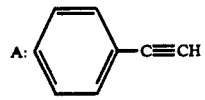

EXAMPLES 8 TO 11 AND COMPARATIVE EXAMPLE 3

100 parts of a polysiloxane which consisted of 90 mole % of dimethylsiloxane unit, 5 mole % of methylvinylsiloxane unit and 5 mole % of methylphenyl unit, was blocked with a trimethylsiloxy group at terminal ends of the molecular chain, and had a viscosity of 100,000 cs. and a content of a low molecular weight siloxane of 1.5% was uniformly mixed with 3 parts of dicumyl peroxide, thereby obtaining a peroxide-vulcanizing composition.

Organic compounds indicated in Table 3 were each added to the composition and thermally cured at 180° C. for 10 minutes. For comparison, the composition to which any organic compound was not added was cured under conditions mentioned above. The resultant cured products were evaluated in the same manner as in Example 1 using the conditions of 80° C.×200 hours, with the results shown in Table 3.

TABLE 3

| Example No. | Organic Compound | Amount of Organic Compound | Waveform of Three Motors After 200 Hours at 80° C. |
|---|---|---|---|
| 8 | B* | 1 | no anomaly in three motors |
| 9 | B | 5 | no anomaly in three motors |
| 10 | (C₄H₉O)₃P=O | 2 | no anomaly in three motors |
| 11 | (C₄H₉O)₃P=O | 10 | no anomaly in three motors |
| Comp. Ex. 3 | nil | — | anomaly occurring in three motors (motors stopped) |

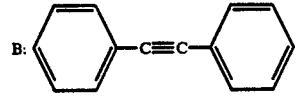

EXAMPLE 12

88 parts of dimethylpolysiloxane, which had a content of a low molecular weight siloxane of 0.2% and a viscosity of 5,000 cs. and which was blocked with a hydroxyl group at terminal ends of the molecular chain was uniformly mixed with 9 parts of fumed silica which had been blocked with a trimethylsilyl group on the surface thereof and 3 parts of fumed silica which had been treated with a cyclic dimethylpolysiloxane on the surface thereof, thereby obtaining a base compound.

Thereafter, 5 parts of vinyltrimethoxysilane, 0.5 parts of γ-tetramethylguanidylpropyltrimethoxysilane, 0.2 parts of dibutyltin dimethoxide and 2 parts of ethyltrimethylsilyl acetate were added to the 100 parts of the base compound, followed by mixing under reduced pressure for 60 minutes and further addition of 1.0 part of ethyl acetoacetate. While the moisture was shut out, the mixture was agitated under reduced pressure for 10 minutes to provide a room temperature curable organopolysiloxane composition.

It will be noted that the low molecular weight siloxane contained in the dimethylpolysiloxane is a cyclic dimethylpolysiloxane of the following formula as shown in Example 1

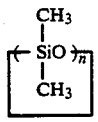

wherein n is an integer of from 3 to 20.

The composition was cured at room temperature for 24 hours to obtain a cured product.

100 g of the cured product was evaluated in the same manner as in Example 1. The results are shown in Table 4.

EXAMPLE 13

The general procedure of Example 12 was repeated using phenylacetylene instead of ethyl acetoacetate used as a compound capable of coordination with metals, thereby obtaining a room temperature curable organopolysiloxane composition. This composition was evaluated in the same manner as in Example 1. The results are shown in Table 4.

EXAMPLE 15

The general procedure of Example 12 was repeated using triethyl phosphate instead of ethyl acetoacetate used as a compound capable of coordination with metals, thereby obtaining a room temperature curable organopolysiloxane composition. This composition was evaluated in the same manner as in Example 1. The results are shown in Table 4.

EXAMPLE 15

88 parts of dimethylpolysiloxane, which had a content of a low molecular weight siloxane of 0.2% and a viscosity of 5,000 cs. and which was blocked with a trimethoxysilyl group at terminal ends of the molecular chain was uniformly mixed with 9 parts of fumed silica which had been blocked with a trimethysilyl group on the surface thereof and 3 parts of fumed silica which had been treated with a cyclic dimethylpolysiloxane on the surface thereof, thereby obtaining a base compound.

Thereafter, 0.5 parts of γ-tetramethylguanidylpropyltrimethoxysilane, 0.2 parts of dibutyltin maleate and 3 parts of 1-trimethoxysilyl-2-carboethoxymethyldimethylethane were added to the 100 parts of the base compound, followed by mixing under reduced pressure for 60 minutes and further addition of 1.0 part of triethyl phosphate. While the moisture was shut out, the mixture was agitated under reduced pressure for 10 minutes to provide a room temperature curable organopolysiloxane composition.

The composition was cured and evaluated in the same manner as in Example 12. The results are shown in Table 4.

COMPARATIVE EXAMPLE 4

The general procedure of Example 12 was repeated without use of any compound capable of coordination with metals, thereby obtaining a room temperature curable organopolysiloxane composition. This composition was cured and evaluated in the same manner as in Example 12. The results are shown in Table 4 below.

TABLE 4

| Example No. | Waveform of Motors After 50 Hours at 20° C. | Waveform of Motors After 500 Hours at 20° C. |
| --- | --- | --- |
| 12 | no anomaly in three motors | no anomaly in three motors |
| 13 | no anomaly in three motors | no anomaly in three motors |
| 14 | no anomaly in three motors | no anomaly in three motors |
| 15 | no anomaly in three motors | no anomaly in three motors |
| Comp. Ex. 4 | three motors stopped | |

What is claimed is:

1. A room temperature vulcanizable silicone composition which comprises:
   (a) 100 parts by weight of a diorganopolysiloxane having a hydroxyl group, or two or more alkoxy groups, or a vinyloxy group blocked at ends of the molecular chain;
   (b) from 1 to 400 parts by weight of a filler;
   (c) up to 50 parts by weight of an alkoxysilane of the following general formula or its partial hydrolyzate $(R^1)_m Si(OR^2)_{4-m}$ wherein $R^1$ represents a substituted or unsubstituted monovalent hydrocarbon group, $R^2$ represents a lower alkyl group or lower alkoxyalkyl group, and m is an integer of from 0 to 2;
   (d) from 0.01 to 10 parts by weight of an organosilicon compound having at least one group of the following general formula in one molecule $[(R^3)_2N]_2C=N-$ wherein $R^3$ represents a hydrogen atom or a monovalent hydrocarbon group;
   (e) from 0.01 to 10 parts by weight of an organic tin compound;
   (f) from 0.1 to 20 parts by weight of an organosilicon compound having a group of the general formula

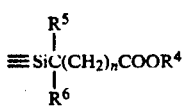

wherein $R^4$ represents a substituted or unsubstituted monovalent hydrocarbon group, $R^5$ and $R^6$ independently represent a hydrogen atom, a methyl group or an ethyl group, and n is a value of 0, 1 or 2; and (g) from 0.01 to 15 parts by weight of an organic compound which has the capability of coordination with metals and has a boiling point of from 50° to 300° C. whereby when the silicone composition is applied as an insulating material for electric or electronic parts, the organic compound in the silicone composition is preferentially adsorbed and deposited on metal contacts in an electric or electronic part, said organic compound being selected from a group consisting of ethers, β-ketoesters, diketones, phosphines, phosphites, phosphates, olefins, acetylene compounds, sulfides, sulfoxides, lactones and lactams.

2. The silicone composition according to claim 1, wherein said diorganopolysiloxane has an average unit formula, $R_aSiO_{(4-a)/2}$, wherein each R independently represents an unsubstituted or substituted monovalent hydrocarbon group, and a is a value of from 1.90 to 2.05 and has a viscosity at 25° C. of not lower than 25 cs.

3. The silicone composition according to claim 1, wherein said alkoxysilane is selected from the group consisting of methyltrimethoxysilane, vinyltrimethoxysilane, phenyltrimethoxysilane, tetramethoxysilane, methyl(trimethoxyethoxy)silane and vinyltri(methoxyethoxy) silane.

4. The silicone composition according to claim 3, wherein said alkoxysilane is partially hydrolyzed.

5. The silicone composition according to claim 1, wherein the ingredient (c) is used in an amount of up to 10 parts by weight per 100 parts by weight of the ingredient (a).

6. The silicone composition according to claim 1, wherein said organosilicon compound (d) is an organosilane of the following formula

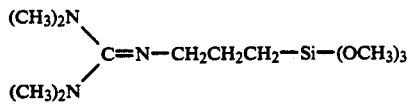

7. The silicone composition according to claim 1, wherein said organosilicon compound (f) further has an alkoxysilyl group.

8. The silicone composition according to claim 1, wherein said organosilicon compound (f) is partially hydrolyzed.

9. The silicone composition according to claim 1, wherein said organic compound (g) is used in an amount of from 0.1 to 5 parts by weight per 100 parts by weight of the ingredient (a).

10. A silicone composition which comprises 100 parts by weight of an organopolysiloxane composition which is adapted for insulation of electric or electronic parts and which comprises a major proportion of a diorganopolysiloxane which has a vinyl group at terminal ends of the molecular chain and/or in the molecular chain and a minor proportion of an organic peroxide crosslinking agent, and from 0.01 to 15 parts by weight of an organic compound which has the capability of coordination with metals, has a boiling point of from 50° to 300° C. and is selected from the group consisting of ethers, β-ketoesters, diketones, phosphines, phosphites, phosphates, styrene, 1-octene, cyclohexene, acetylene compounds, sulfides, sulfoxides, lactones and lactams, whereby when the silicone composition is applied to an electric or electronic part, the organic compound is preferentially adsorbed and deposited on metal contacts in the electric or electronic part.

11. A silicone composition which comprises 100 parts by weight of a radiation-curable composition which is adapted for insulation of electric or electronic parts and which comprises a major proportion of a diorganopolysiloxane which has an unsaturated group, a mercapto group, an epoxy group or a hydrosilyl group at terminal ends of the molecular chain and/or in the molecular chain and a minor proportion of a reaction initiator which initiates the radiation curing reaction of the diorganopolysiloxane, and from 0.01 to 15 parts by weight of an organic compound which has the capability of coordination with metals, has a boiling point of from 50° to 300° C. and selected from the group consisting of ethers, β-ketoesters, diketones, phosphines, phosphites, phosphates, olefins, acetylene compounds, sulfides, sulfoxides, lactones and lactams, whereby when the silicone composition is applied to an electric or electronic part, the organic compound is preferentially adsorbed and deposited on metal contacts in the electric or electronic part.

12. A silicone composition which comprises 100 parts by weight of a grease composition which is adapted for insulation of electric or electronic parts and which comprises a major proportion of a diorganopolysiloxane which has a trimethylsilyl group at terminal ends of the molecular chain and a minor proportion of a thickening agent, and from 0.01 to 15 parts by weight of an organic compound which has the capability of coordination with metals, has a boiling point of from 50° to 300° C. and is selected from the group consisting of ethers, β-ketoesters, diketones, phosphines, phosphites, phosphates, olefins, acetylene compounds, sulfides, sulfoxides, lactones and lactams, whereby when the silicone composition is applied to an electric or electronic part, the organic compound is preferentially adsorbed and deposited on metal contacts in the electric or electronic part.

* * * * *